United States Patent [19]

Hwang

[11] Patent Number: 5,672,253

[45] Date of Patent: Sep. 30, 1997

[54] APPARATUS FOR MAKING HEXAGONAL AND PENTAGONAL MOLECULAR STRUCTURE WATER

[75] Inventor: Gui Nan Hwang, Kyungsangnam-do, Rep. of Korea

[73] Assignee: Goldstar Co., Ltd., Seoul, Rep. of Korea

[21] Appl. No.: 641,266

[22] Filed: Apr. 30, 1996

Related U.S. Application Data

[63] Continuation of Ser. No. 270,486, Jul. 5, 1994, abandoned.

[30] Foreign Application Priority Data

| Jul. 5, 1993 | [KR] | Rep. of Korea | 12246/1993 |
| Jul. 5, 1993 | [KR] | Rep. of Korea | 12541/1993 |
| Jul. 5, 1993 | [KR] | Rep. of Korea | 12543/1993 |

[51] Int. Cl.$^6$ .................. C25B 9/00; C25B 15/08
[52] U.S. Cl. .............. 204/240; 204/241; 204/253; 204/262; 204/264; 204/275; 204/276; 204/274
[58] Field of Search .................. 204/241, 276, 204/240, DIG. 5, 267, 262, 274, 253, 264, 275

[56] References Cited

U.S. PATENT DOCUMENTS

| 4,152,238 | 5/1979 | Okazaki | 204/241 X |
| 4,810,344 | 3/1989 | Okazaki | 204/DIG. 5 |
| 4,822,458 | 4/1989 | Ogden | 204/274 X |
| 5,083,442 | 1/1992 | Vlock | 62/338 |
| 5,200,054 | 4/1993 | Glenn et al. | 204/241 X |

FOREIGN PATENT DOCUMENTS

| A-0562747-A2 | 9/1993 | European Pat. Off. |
| A-2597468 | 10/1987 | France |

*Primary Examiner*—Donald R. Valentine
*Attorney, Agent, or Firm*—David E. Lovejoy

[57] ABSTRACT

A hexagonal and pentagonal molecular structure water making apparatus includes an upper water reservoir disposed at a predetermined portion of the refrigerating chamber of the refrigerator, a hexagonal and pentagonal molecular structure water generating section for generating hexagonal and pentagonal molecular structure water by electrolysis of water from the upper water reservoir, a hexagonal and pentagonal molecular structure water storing section for storing hexagonal and pentagonal molecular structure water generated at the hexagonal and pentagonal molecular structure water generating section, and a freezing container for storing hexagonal molecular structure water after receiving water stored at the hexagonal molecular structure water storing reservoir of the hexagonal molecular structure water storing section through a connecting pipe. The hexagonal and pentagonal molecular structure water have useful effects for preventing adult diseases.

19 Claims, 9 Drawing Sheets

FIG. 1

PRIOR ART

APPARATUS FOR MAKING HEXAGONAL AND PENTAGONAL MOLECULAR STRUCTURE WATER

This application is a file wrapper continuation of Ser. No. 08/270,486, Jul. 5, 1994, now abandoned.

BACKGROUND OF THE INVENTION

1. Field of the Invention

The present invention relates to an apparatus for making hexagonal and pentagonal molecular structure water, and more particularly to separately supplying hexagonal molecular structure water and pentagonal molecular structure water.

2. Description of the Prior Art

Figure 2A:
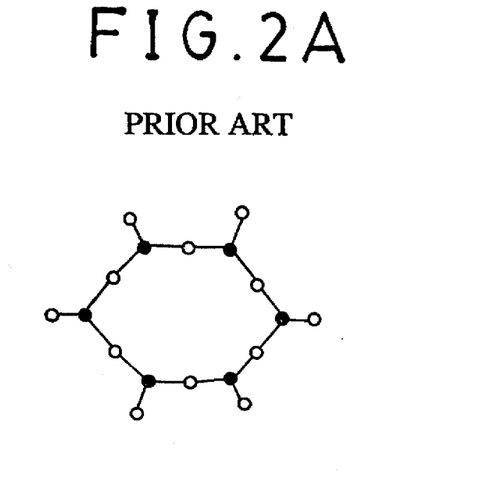
FIGS. 2A, 2B and 2C are views showing hexagonal and pentagonal molecular structural formulas of water, respectively.
Figure 2B:
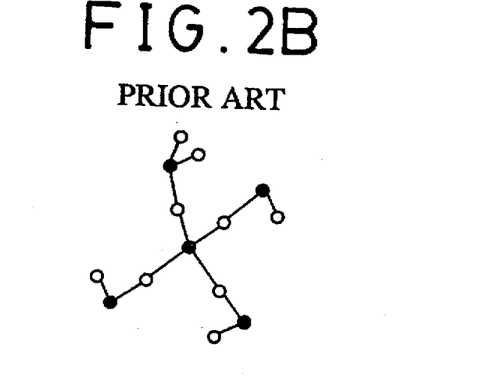
Figure 2C:
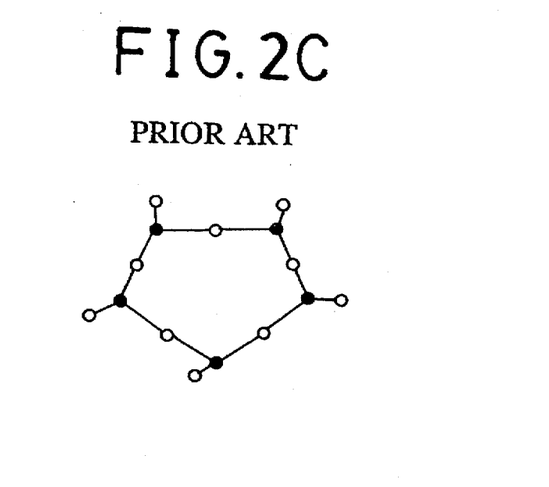

Conventionally, water is classified into hexagonal water and pentagonal water based on its molecular structure, as shown in FIGS. 2A to 2C. Each type of water having these structures has a different effect on the human body when taken. The hexagonal molecular structure water, as shown in FIG. 2A, is well known to have effects in prevention of some adult diseases such as cancer, constipation, diabetics, and gastroenteric disorders. The pentagonal molecular structure water, as shown in FIG. 2C, is well known to have good effects for skin care and the prevention of skin disease.

Meanwhile, the water molecular structure described above can be rearranged by the change of ions dissolved in the water. For example, Lithium(Li), Sodium(Na), Calcium(Ca), Strontium(Sr), Silver(Ag), and Zinc(Zn) may cause the water structure to change into the hexagonal molecular structure water. In addition, Potassium(K), Rubidium(Ru), Magnesium(Mg), Aluminum(Al), Chlorine(Cl) and Cesium(Cs) break the hexagonal molecular structure and create a pentagonal molecular structure.

There, so far, is no known the apparatus which can make the common molecular structure water into hexagonal or pentagonal molecular structure water, except for methods of just cooling or freezing the water.

Figure 1:
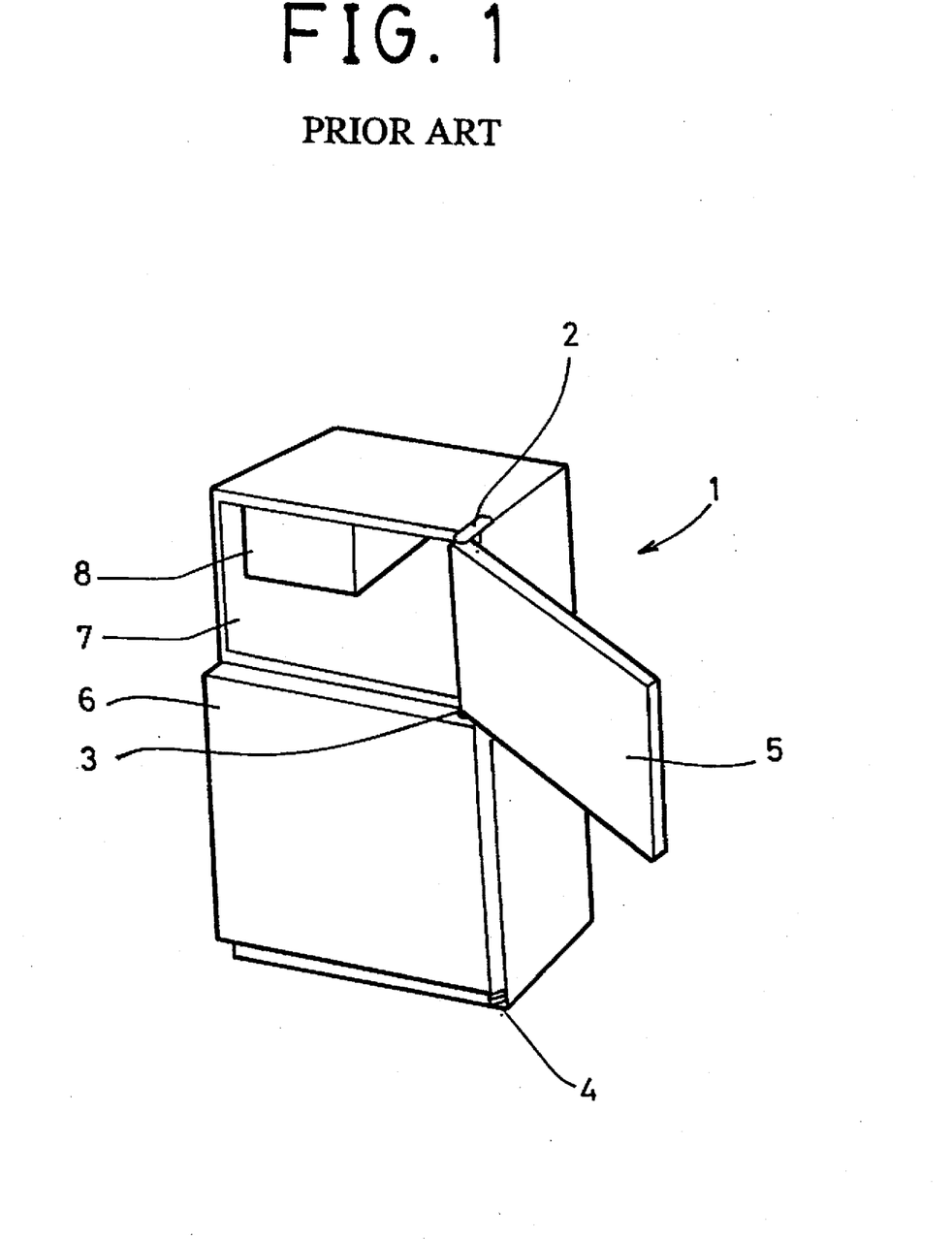
FIG. 1 is a perspective view showing a conventional refrigerator.

Referring to FIG. 1, reference numeral 1 indicates a body of a refrigerator.

On the front surface of the refrigerator 1, a freezing chamber door 5 and a refrigerating chamber door 6 are engaged with an upper hinge 2, a middle hinge 3, and a lower hinge 4, respectively.

Reference numeral 8 indicates a quick freezing chamber with an ice container(not shown), which is disposed inside the freezing chamber 7. Conventionally, the ice generated in the ice container with common water like faucet water can be available for use, but it has not been good for the health care.

SUMMARY OF THE INVENTION

Accordingly, it is an object of the present invention to provide an apparatus for making hexagonal molecular structure water and pentagonal molecular structure water by means of ions generated by the electrolysis of water.

It is another object of the present invention to provide a freezing apparatus of hexagonal molecular structure water, useful for the human body, by means of the electrolysis of water when making the ice in the refrigerator.

For achieving the objecting of the present invention it includes an upper water reservoir disposed at a predetermined portion of the refrigerating chamber of the refrigerator, a hexagonal and pentagonal molecular structure water generating section for generating hexagonal and pentagonal molecular structure water by electrolysis of water from the upper water reservoir, a hexagonal and pentagonal molecular structure water storing section for storing hexagonal and pentagonal molecular structure water generated at the hexagonal and pentagonal molecular structure water generating section, and a freezing container for storing hexagonal molecular structure water after receiving water stored at the hexagonal molecular structure water storing reservoir of the hexagonal molecular structure water storing section through a connecting pipe.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENTS

Figure 3:
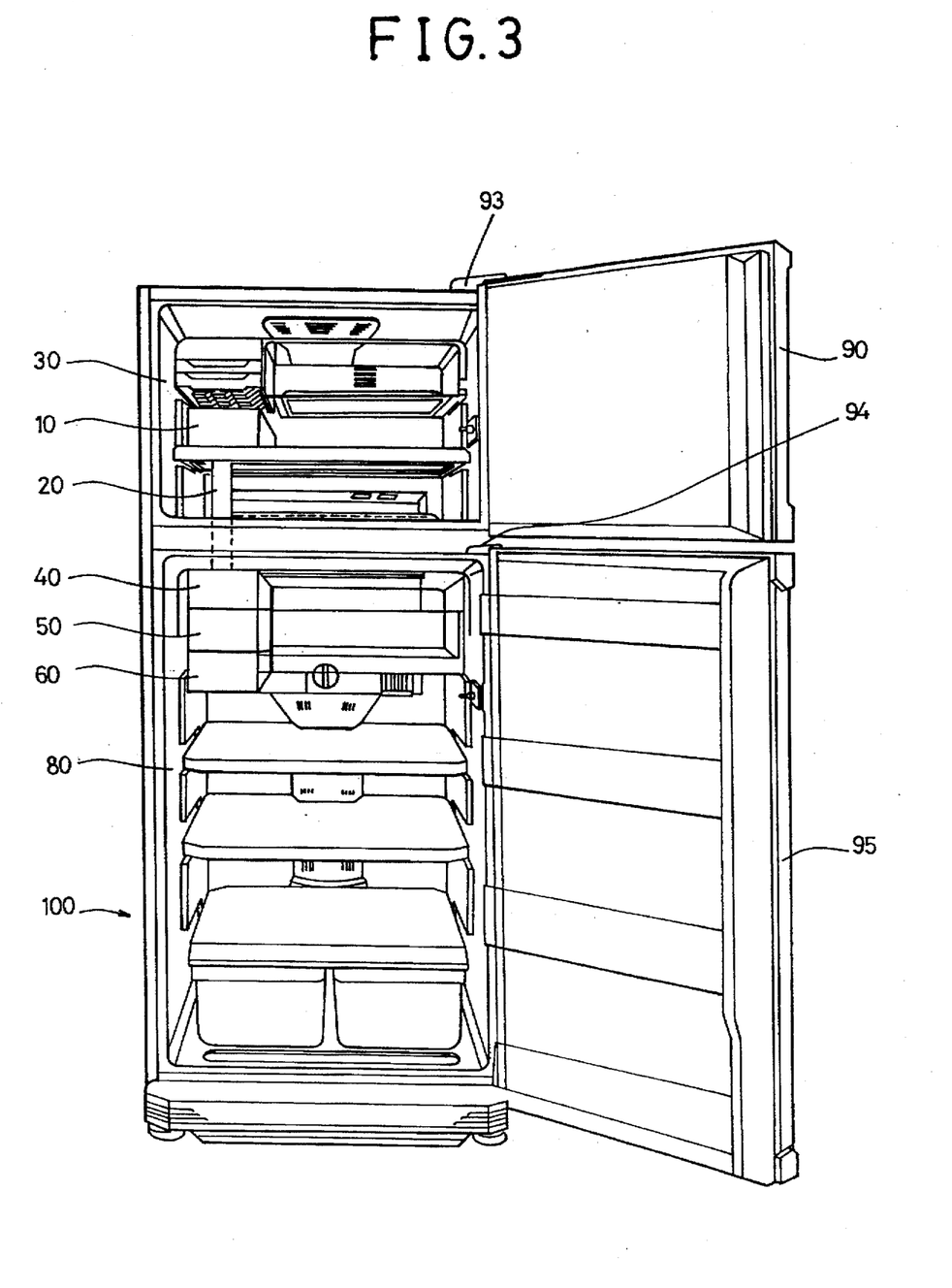
FIG. 3 is a perspective view showing a refrigerator with an apparatus for making hexagonal and pentagonal molecular structure water according to a first embodiment of the present invention.

Referring to FIG. 3, there is shown a refrigerator with hexagonal and pentagonal molecular structure water apparatus according to a first embodiment of the present invention.

In the drawing, reference numeral 100 indicates a refrigerator body. On the front surface of the refrigerator body 100, a freezing chamber door 90 and a refrigerating chamber door 95 are engaged with hinges 93 and 94, respectively.

The refrigerator body 100 is divided into two chambers, i.e., a freezing chamber 30 and a refrigerating chamber 80. A freezing container 10, with a connecting pipe 20 at one portion of the left inside of the freezing chamber 30, is disposed inside the freezing chamber 30. Inside the refrigerating chamber 80, an upper water reservoir 40, a hexagonal and pentagonal molecular structure water generating section 50, and a hexagonal and pentagonal molecular structure water storing section 60 are disposed in order from the top.

Figure 4:
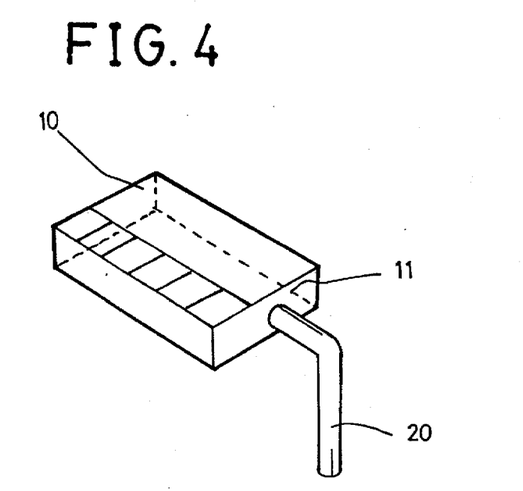
FIG. 4 is an enlarged view showing a freezing container of FIG. 3.

Referring to FIG. 4, there is shown an enlarged freezing container 10 of FIG. 3. The freezing container 10 is shaped like a top opened box. A right angled connecting pipe 20 is disposed at one portion of the wall 11 of the freezing container 10. A plate(not shown) with a plurality of small boxes, for making a desired ice shape, is disposed inside the freezing container 10.

Figure 5:
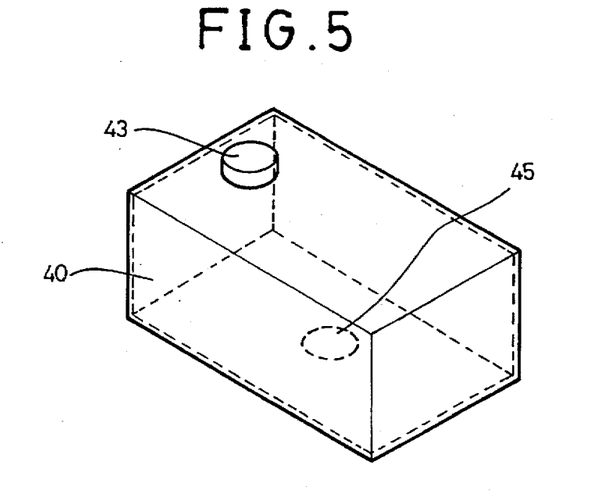
FIG. 5 is a perspective view showing an upper water reservoir of FIG. 4.

Referring to FIG. 5, there is shown an enlarged upper water reservoir 40 disposed at one portion of the refrigerating chamber 40, which is provided with a lid 43 for receiving water and an exhausting section 45 disposed at the bottom thereof.

Figure 6:
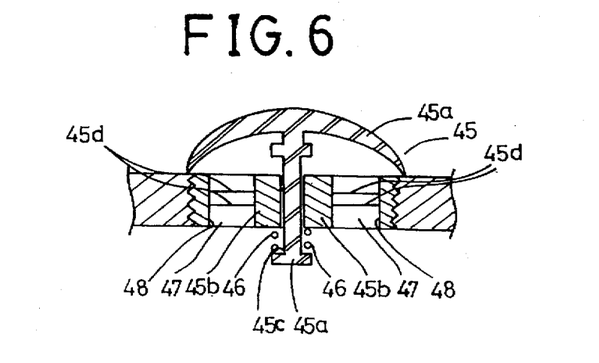
FIG. 6 is an enlarged sectional view showing an exhausting section of FIG. 5.

FIG. 6 shows the exhausting section 45 in details. In the drawing, there are shown a hollow cock support 45b, a T-shaped cock 45a inserted into the upper water reservoir 40 through the cock support 45b, a spring 46 disposed between a lower space of the cock 45a and a corner of the lower protrusion 45c, and a lid 48 integrally formed with a plurality of ribs 45d connected with the cock support 45b. The lid 48 is threadedly coupled with a lower surface of the upper water reservoir 40. Reference numeral 47 in FIG. 6 indicates an outlet for discharging water through the fibs 45d.

Figure 7:
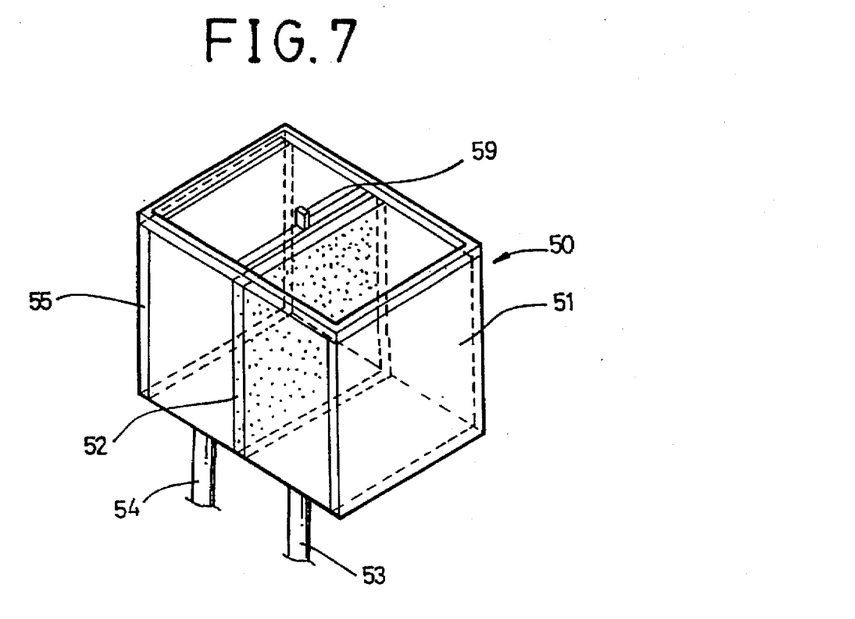
FIG. 7 is a schematic perspective view showing hexagonal and pentagonal molecular structure water generating section according to the first embodiment of the present invention.

Meanwhile, the hexagonal and pentagonal molecular structure water generating section 50, shaped like a top opened box, includes a pushing protrusion 59 for pushing and opening the cock 45a, a plate-shaped filter 52 disposed at an intermediate position thereof, and a positive pole plate 55 and a negative pole plate 51 disposed at both walls of the hexagonal and pentagonal molecular structure water generating section 50. In addition, a hexagonal molecular structure water path 53 and a pentagonal molecular structure water path 54 are respectively disposed at each bottom thereof. The positive pole plate 55 and negative pole plate 51 are connected with the microcomputer(not shown), respectively, with a supply of direct current of 12 V.

Figure 8:
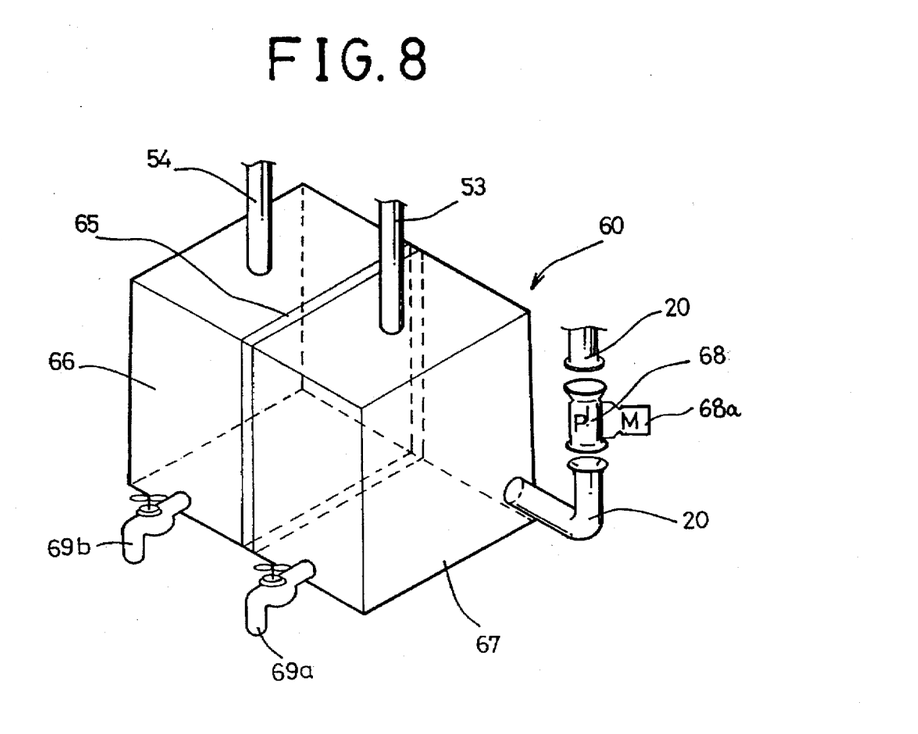
FIG. 8 is a perspective view showing hexagonal and pentagonal molecular structure water storing section according to the first embodiment of the present invention.

FIG. 8 shows a hexagonal and pentagonal molecular structure water storing section 60. In the drawing, a separating plate 65 is disposed at an intermediate position of the hexagonal and pentagonal molecular water storing section 60 for separating into the hexagonal and pentagonal molecular structure water, respectively. By disposing the separating plate 65, the pentagonal molecular structure water storing reservoir 65 is formed at the left side thereof and the hexagonal molecular structure water storing reservoir 67 is formed at the right side thereof. A pump 68 and a motor 68a are disposed at a predetermined portion of the connecting pipe 20, which is disposed at one portion of the hexagonal molecular structure water reservoir 67, for enabling the hexagonal molecular structure water in the hexagonal molecular structure water reservoir 67 to flow into the freezing container 10 through the connecting pipe 20. In addition, a tap-shaped hexagonal molecular structure water valve 69a and a tap-shaped pentagonal molecular structure water valve 69b are disposed at a predetermined lower portion of the front wall of the hexagonal molecular structure water storing reservoir 67 and the pentagonal molecular structure water storing reservoir 66.

From now on, the operation of the first embodiment will be explained.

In a state that a lid 43 is opened, the mineral water or desired water is supplied into the upper water reservoir 40. The upper water reservoir is disposed on the hexagonal and pentagonal molecular structure water generating section 50. A center of the cock 45a of the exhausting section 45, disposed at the lower portion of the upper water reservoir 40, is fixed to be placed on the pushing protrusion 59, so that the cock 45a of the exhausting section 45 is opened and then the water flows into the hexagonal and pentagonal molecular water structure generating section 50. The water which flows in a direction of the positive pole plate 55 of the hexagonal and pentagonal molecular structure water generating section 50 becomes hexagonal molecular structure water by means of the electrolysis of water and the water which flows in a direction of the negative pole plate 51 of the hexagonal and pentagonal molecular structure water generating section 50 also becomes pentagonal molecular structure water by means of the electrolysis of water.

At this time, for making the ice of the hexagonal molecular water structure water, the water of hexagonal molecular structure flows into the hexagonal molecular structure water storing reservoir 67 through the hexagonal molecular structure water path 53, and by means of the pump 68, disposed at the connecting pipe 20, driven by the motor 68a, hexagonal molecular structure water flows into the freezing container 10 through the connecting pipe 20. The hexagonal molecular structure water is frozen therein thereby obtaining the hexagonal molecular structure water.

In addition, the hexagonal molecular structure water in the hexagonal molecular structure water storing container 67 is available for the user to drink. The pentagonal molecular structure water in the pentagonal molecular structure water storing container 66 is also available for user to drink.

Figure 9:
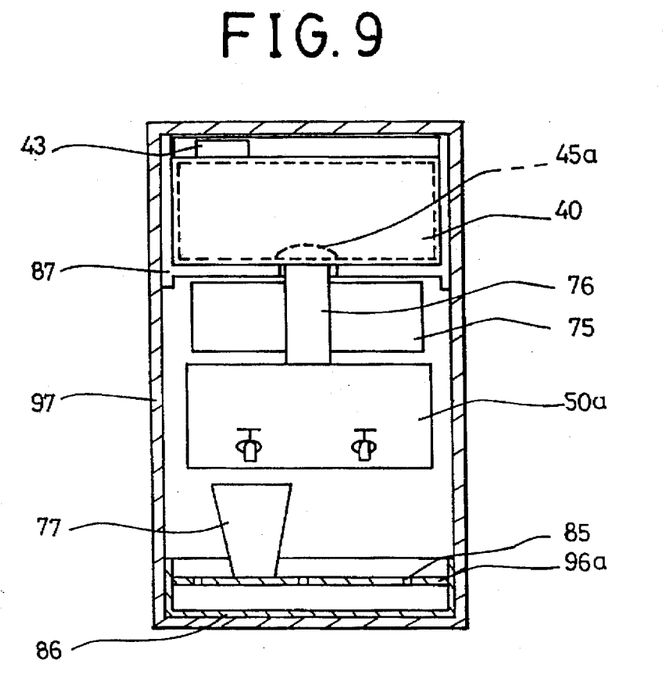
FIG. 9 is a front view showing an apparatus for making hexagonal and pentagonal molecular structure water according to a second embodiment of the present invention.

Referring to FIG. 9, there is shown an apparatus for making the hexagonal and pentagonal molecular structure water according to the second embodiment of the present invention.

First, in comparison with the first embodiment of the present invention, which is utilizing the freezing chamber 30 for achieving the object of the invention, the second embodiment of the present invention utilizes only the refrigerating chamber 80, with reference to FIG. 3.

In FIG. 9, reference numeral 97 indicates a cabinet of the hexagonal and pentagonal molecular structure water making apparatus.

In an tipper inside portion of the cubic-shaped cabinet 97 is disposed a water reservoir support 87. On the water reservoir support 87 is placed the upper water reservoir 40 with the lid 43. A permanent magnet 75 with a hollow path 76 is disposed below the upper water reservoir 40. The hexagonal and pentagonal molecular structure water generating section 50a is disposed below the permanent magnet 75 for making the hexagonal and pentagonal molecular structure water and separating the water into two parts of the hexagonal molecular structure water and the pentagonal molecular structure water.

Meanwhile, a structure of the exhausting section 45 disposed at the lower portion of the upper water reservoir 40 is similar to one of the first embodiment of the present invention, except for its reversed location, so the description thereof is not provided.

Figure 10:
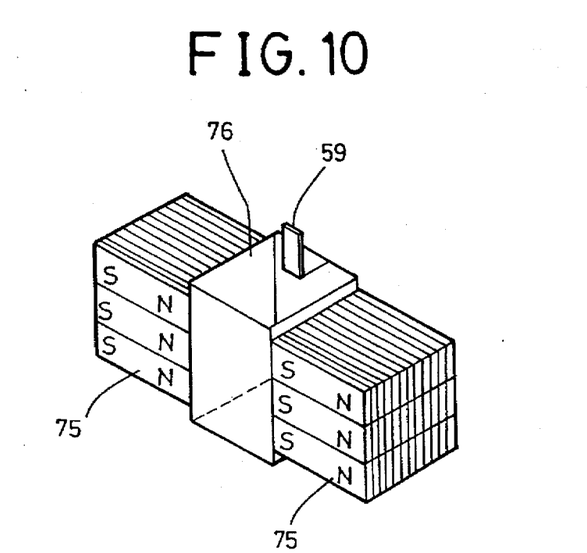
FIG. 10 is a perspective view showing a permanent magnet of FIG. 9.

The permanent magnet 75 for stabilizing the structure of water is disposed around the left and right side of the path 76 between the hexagonal and pentagonal molecular structure water generating section 50a of the upper water reservoir 40. As shown in FIG. 10, the permanent magnet 75 is disposed in the form of alternate disposition of South and North poles thereof. A pushing protrusion 59 for pushing and opening the cock 45a shown in FIG. 6 is disposed at the path 76 in an inwardly protruded form.

Figure 11:
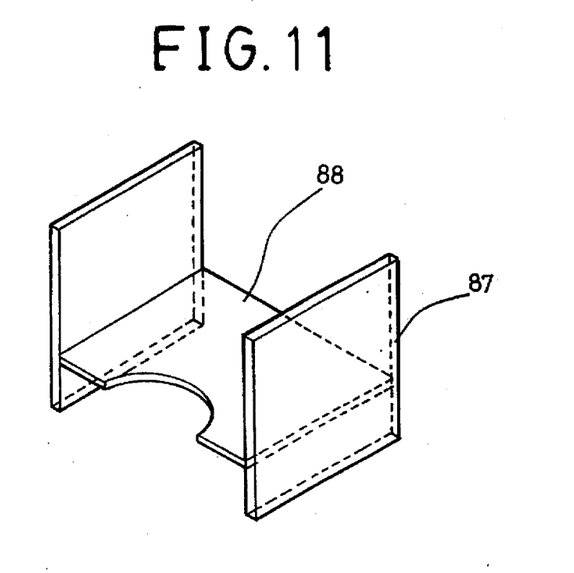
FIG. 11 is a perspective view showing a water reservoir supporting section for supporting the upper water reservoir.
Figure 12:
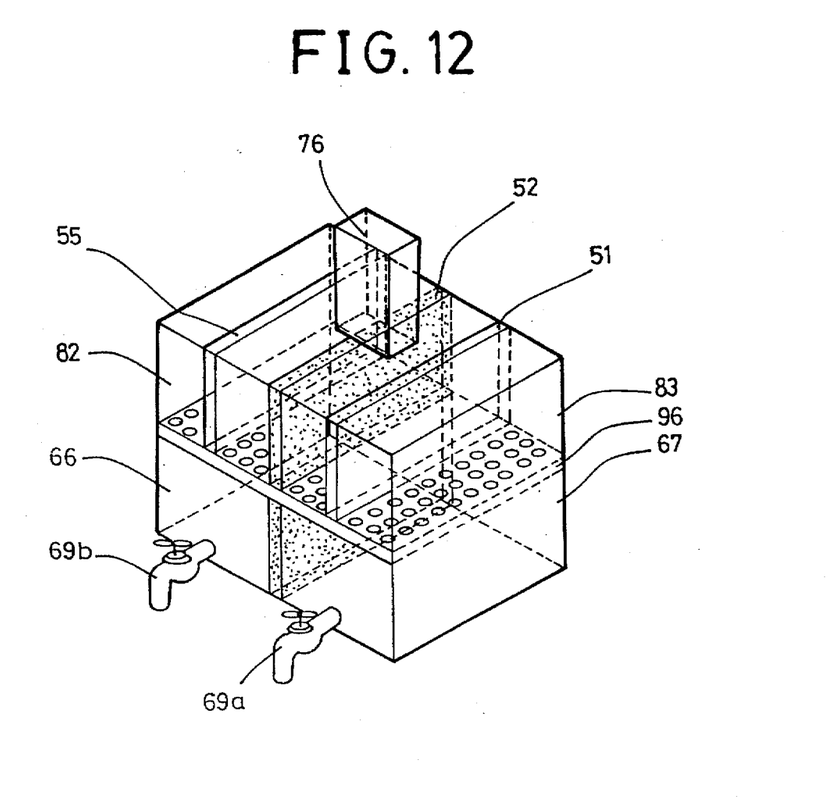
FIG. 12 is a perspective view showing hexagonal and pentagonal molecular structure water generating section according to the second embodiment of the present invention.

FIG. 11 shows the water reservoir support 87 for supporting the upper water reservoir 40. A supporting plate 88 with a semi-circular groove is disposed inside the water reservoir support 87. The upper water reservoir 40 is inserted into and supported to the supporting plate 88. The water reservoir support 87 and the supporting plate 88 is preferably made of the plastic materials, but possibly made of the steel plate. The hexagonal and pentagonal molecular structure water generating section 50a, as shown in FIG. 12, in a shape of the upper portion opened is disposed with the ventilating plate 96 having a function of the filter in a horizontal direction and with the plate-shaped filter 52 in a vertical direction. Thus, the ventilating plate 96 and the filter 52 are disposed inside the hexagonal and pentagonal molecular structure water generating section 50a so that they cross each other. The plate-shaped positive pole plate 55 and the plate-shaped negative pole plate 51 are disposed at the top of the ventilating plate 96 predetermingly apart from the filter 52 by a predetermined space. The filter 52 functions to pass the positive and negative ions therethrough, and the negative pole plate 51 and positive pole plate 55 activate for generating the positive or negative ions.

Meanwhile, the pentagonal molecular structure water storing reservoir 66 is disposed below the ventilating plate 96 of the side of the positive pole plate 55 for storing the pentagonal molecular structure water, and the hexagonal molecular structure water storing reservoir 67 is disposed below the ventilating plate 96 of the side of the negative pole plate 51 for storing the hexagonal molecular structure water. The pentagonal molecular structure water valve 69b is disposed at a front surface of the pentagonal molecular structure water storing reservoir 66, and the hexagonal molecular structure water valve 69a is disposed at a front surface of the hexagonal molecular structure water storing reservoir 67.

Figure 13:
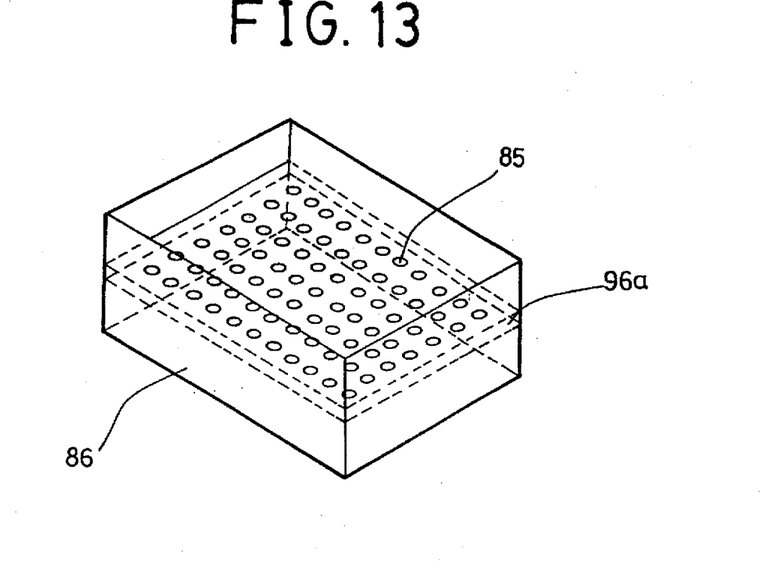
FIG. 13 is a schematic perspective view showing a waterspout container according to the second embodiment of the present invention.

As shown in FIGS. 9 and 13, a ventilating plate 96a with a plurality of holes 85 for supporting the cup 77 and preventing water's splashing, is horizontly disposed at the intermediate position of the waterspout container 86. The water in the waterspout container 86 is later evaluated by the user.

As the apparatus for making the hexagonal and pentagonal molecular structure water is described above, it can be dispose inside the freezing chamber of the refrigerator, in addition it is also available to dispose separately from the refrigerator.

The operation of the second embodiment of the present invention will be explained.

In a state that the lid 43 is opened, the mineral water or desired water is supplied into the upper water reservoir 40. The upper water reservoir 40 is disposed at the hexagonal and pentagonal molecular structure water generating section 50. The center of the cock 45a of the exhausting section 45, disposed at the lower portion of the upper water reservoir 40, is placed on the pushing protrusion 59, so that the cock 45a of the exhausting section 45 is opened and then the mineral water or desired water flows downwardly. At this time, as the water stored in the upper water reservoir 40 flows along the path 76, the structure of water is stabilized by means of the permanent magnet 75. At this time, the stabilization means used to decrease the molecular structure of water for better conditions for making hexagonal molecular structure water through the means of ions. After that, the positive ions in the water gather to the negative pole plate 51 and the negative ions in the water gather to the positive pole plate 55. The negative pole plate 51 and the positive pole plate 55 are respectively connected to a microcomputer(not shown) and applied with a direct current of 12 V.

Meanwhile, the hexagonal molecular structure water generated by means of the electrolysis at the hexagonal molecular structure water generating reservoir 83 is stored in the hexagonal molecular structure water storing reservoir 67 and the pentagonal molecular structure water generated at the pentagonal molecular structure water generating reservoir 82 is stored in the pentagonal molecular structure water storing reservoir 66. By opening the hexagonal molecular structure water valve 69, a user may obtain the hexagonal molecular structure water, and by opening the pentagonal molecular structure water valve 9b, the pentagonal molecular structure water may be available. In addition, the splashing water is gathered at the waterspout container 86 through the holes 85.

The third embodiment of the present invention will be explained.

Figure 14:
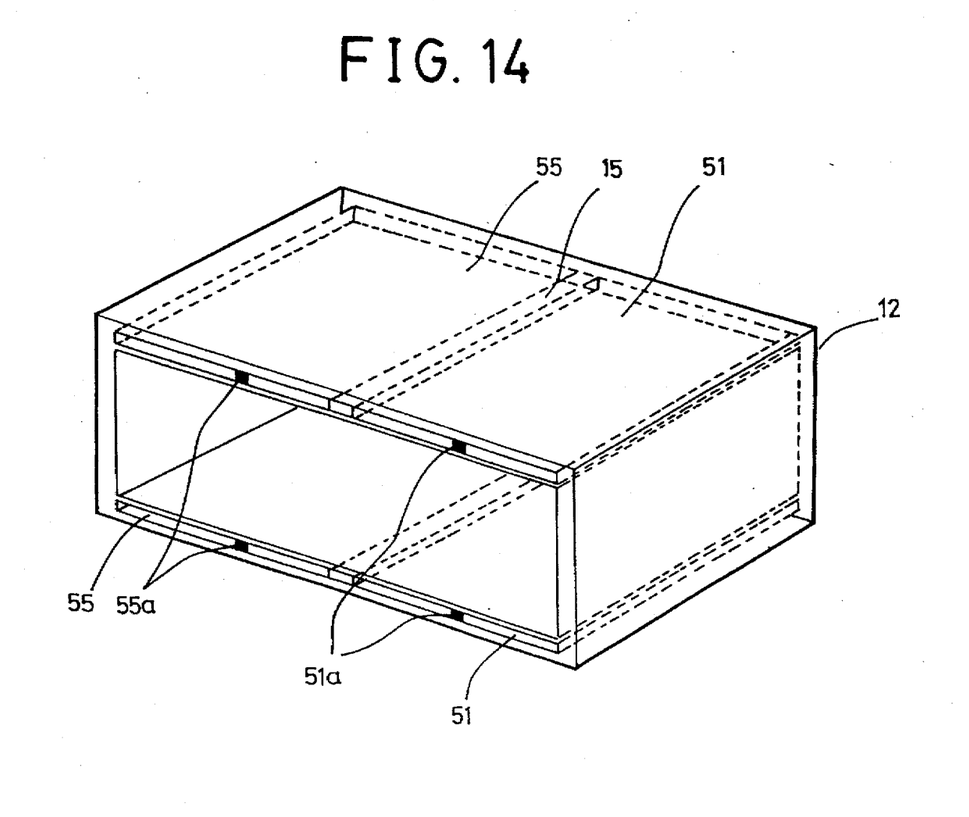
FIG. 14 is a schematic perspective view showing a hexagonal molecular structure water making apparatus according to a third embodiment of the present invention.

Referring to FIG. 14, it is replaced the freezing container disposed at the freezing chamber of the first embodiment is replaced with the affixing frame having the freezing container. In the drawing, reference numeral 12 indicates an affixing frame to be disposed at the left of the freezing chamber 30 shown in FIG. 3. The freezing container 10a in the affixing frame 12 is detachably disposed.

The affixing frame 12, as shown in FIG. 14, is disposed with the plate-shaped negative pole plate 51 and the plate-shaped positive pole plate 55 at the bottom thereof. The insulator 15 is disposed between the two pole plates 51 and 55. A plurality of electric poles 51a and 55a are disposed at the front side of the two pole plates 51 and 55, respectively, and connected with a power supply cable (not shown).

Figure 15:
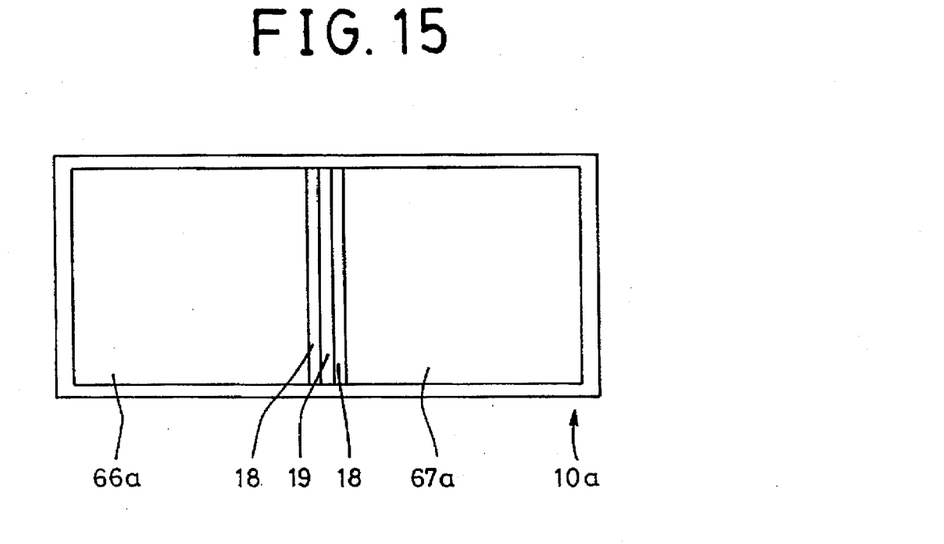
FIG. 15 is a front view showing a freezing container according to the third embodiment of the present invention.
Figure 16:
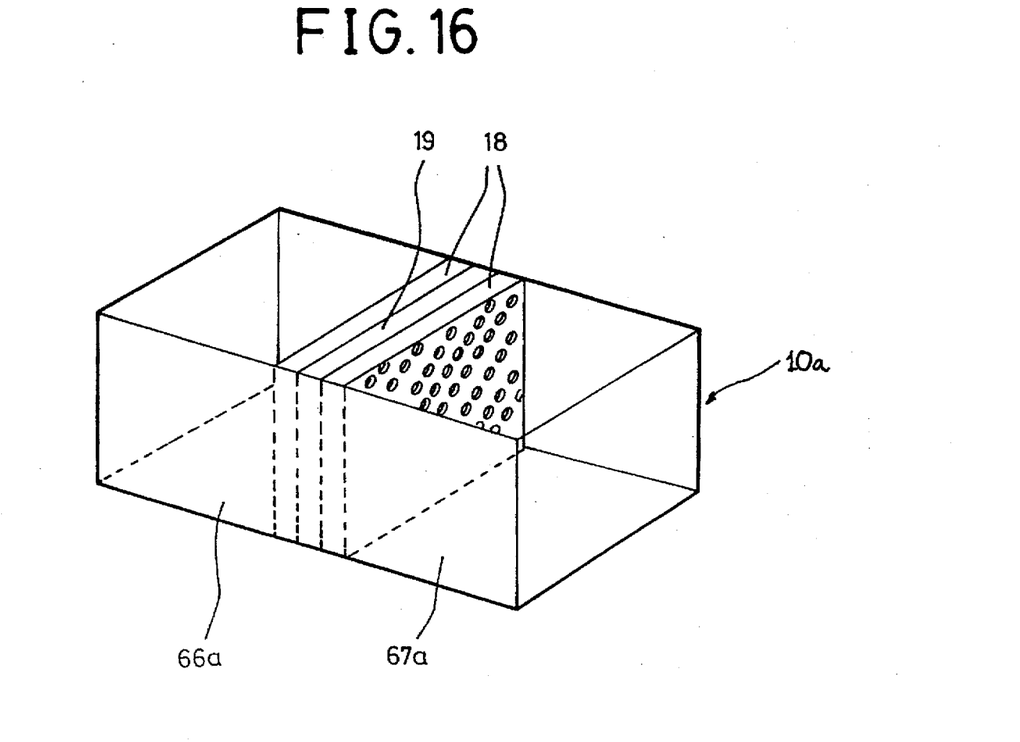
FIG. 16 is an enlarged perspective view showing ion passing filter and supporting plate of FIG. 15.

The freezing container 10a, as shown in FIGS. 15 and 16, is disposed with the hexagonal molecular structure water ice generating section 67a and the pentagonal molecular structure water ice generating section 66a at both sides thereof. The ion box and the filter are disposed between two ice generating sections 67a and 66a, and supported by means of the support 19. In the third embodiment of the present invention, only one ion box and one filter 19 are shown, but it is possible to use a plurality of the ion boxes and filters.

The operation of the hexagonal and pentagonal molecular structure water freezing apparatus according to the third embodiment of the present invention will be explained.

After filling the freezing container 10a with mineral water or desired water, it is needed to insert the freezing container 10a into the affixing frame 12. When the power is supplied to the negative pole plate 51 and the positive pole plate 55 through the electric poles 51a and 55a, by means of the electric charge, the positive ions of the water gather to the negative pole plate 51 and the negative ions of the water gather to the positive pole plate 55. By receiving the hexagonal molecular structure water therefrom, and then the hexagonal molecular structure ice is made at the hexagonal molecular structure ice generating section 67a of the freezing container 16. By receiving the pentagonal molecular structure water therefrom, and then the pentagonal molecular structure ice is made at the pentagonal molecular structure ice generating section 66a of the freezing container 16.

As described above, the hexagonal and pentagonal molecular structure water generating apparatus according to the present invention provides the effect of separating the water into two types of ions and generating the hexagonal molecular structure water and the pentagonal molecular structure water by means of the electrolysis of water, which are useful for the human body. The hexagonal molecular structure water freezing apparatus of the present invention also provides a fresh hexagonal molecular structure ice, which are also useful for human body when it is taken.

What is claimed is:

1. An apparatus for making hexagonal and pentagonal molecular structure water, comprising:

a water reservoir disposed in a refrigerating chamber of a refrigerator for storing water;

a hexagonal and pentagonal molecular structure water generating section for receiving the water from the water reservoir and for generating hexagonal and pentagonal molecular structure water by electrolysis of the water from the water reservoir;

a hexagonal and pentagonal molecular structure water storing section for receiving and storing the hexagonal and pentagonal molecular structure water generated by the hexagonal and pentagonal molecular structure water generating section; and a freezing container disposed in a freezing chamber of a refrigerator for receiving the hexagonal molecular structure water from the hexagonal molecular structure water storing section and for storing frozen hexagonal molecular structure water.

2. The apparatus of claim 1, wherein said water reservoir includes a lid disposed at a top thereof and an exhausting section disposed at a bottom thereof.

3. The apparatus of claim 2, wherein said exhausting section includes a hollow cock support, a T-shaped cock passing through the cock support, a spring disposed between a lower space of the cock and a lower protrusion of the cock support, and a lid integrally formed with ribs thereof and disposed at the cock support.

4. The apparatus of claim 1, wherein said hexagonal and pentagonal molecular structure water generating section includes a pushing protrusion disposed for opening a cock, a plate-shaped filter disposed at an intermediate position thereof, positive and negative pole plates disposed at both sides thereof, and hexagonal and pentagonal molecular structure water paths disposed at a lower portion thereof.

5. The apparatus of claim 1, wherein said hexagonal and pentagonal molecular structure water storing section is divided into a pentagonal molecular structure water storing reservoir and a hexagonal molecular structure water storing reservoir by a separating plate disposed at an intermediate position thereof.

6. The apparatus of claim 5 further including a pump, disposed with a connecting pipe for causing hexagonal and pentagonal molecular structure water to flow into the freezing container from the hexagonal and pentagonal molecular structure water storing section.

7. The apparatus of claim 5, wherein said hexagonal and pentagonal molecular structure water storing reservoirs each includes a water valve disposed in a wall thereof.

8. The apparatus of claim 1 including a connecting pipe disposed to connect the freezing container to the water storing section.

9. An apparatus for making hexagonal and pentagonal molecular structure water, comprising:

a water reservoir having a lower portion and forming a water path;

a support for supporting the water reservoir; p1 a permanent magnet, disposed at the lower portion, for stabilizing the water structure generated in said path; and a hexagonal and pentagonal molecular structure water generating section, disposed at a lower portion of the permanent magnet, for convening water into hexagonal and pentagonal molecular structure water by means of electrolysis.

10. The apparatus of claim 9, wherein said water reservoir support is integrally formed with a supporting plate having a semi-circularly grooved inner side.

11. The apparatus of claim 9, wherein said permanent magnet is alternatively disposed with a south pole and a north pole.

12. The apparatus of claim 9, wherein said path includes a pushing protrusion at an upper portion thereof.

13. The apparatus of claim 9, wherein said hexagonal and pentagonal molecular structure water generating section further comprises:

a filter, disposed at an intermediate position thereof in a vertical direction, for passing positive and negative ions therethrough;

a positive pole plate spaced apart from the filter for gathering negative ions and a negative pole plate for gathering positive ions;

hexagonal and pentagonal molecular structure water generating reservoirs for respectively generating hexagonal and pentagonal molecular structure water;

hexagonal and pentagonal molecular structure water storing reservoirs for respectively storing hexagonal and pentagonal molecular structure water therein; and hexagonal and pentagonal molecular structure water valves for respectively discharging hexagonal and pentagonal molecular structure water.

14. The apparatus of claim 13, wherein said hexagonal and pentagonal molecular structure water generating sections each include a waterspout container, having a ventilating plate with a plurality of holes for supporting a cup and storing therein water to prevent splashing of water.

15. An apparatus for making hexagonal and pentagonal molecular structure water, comprising:

plate-shaped negative and positive pole plates each disposed at upper and lower portions of an affixing frame coupled with a freezing chamber of a main body; and a freezing container detachably mounted to said affixing frame.

16. The apparatus of claim 15, wherein said positive and negative pole plates includes an insulating material therebetween.

17. The apparatus of claim 15, wherein said positive and negative pole plates include a plurality of electric poles in front thereof.

18. The apparatus of claim 15, wherein said freezing container includes a hexagonal molecular ice generating section and a pentagonal molecular structure ice generating section at both sides thereof and an ion filter supported by a support plate.

19. The apparatus of claim 18, wherein said supporting plate has a semi-circular groove.

* * * * *